June 6, 1961  C. S. MORRISON ET AL  2,987,127
FARM IMPLEMENT
Filed April 20, 1959  2 Sheets-Sheet 1
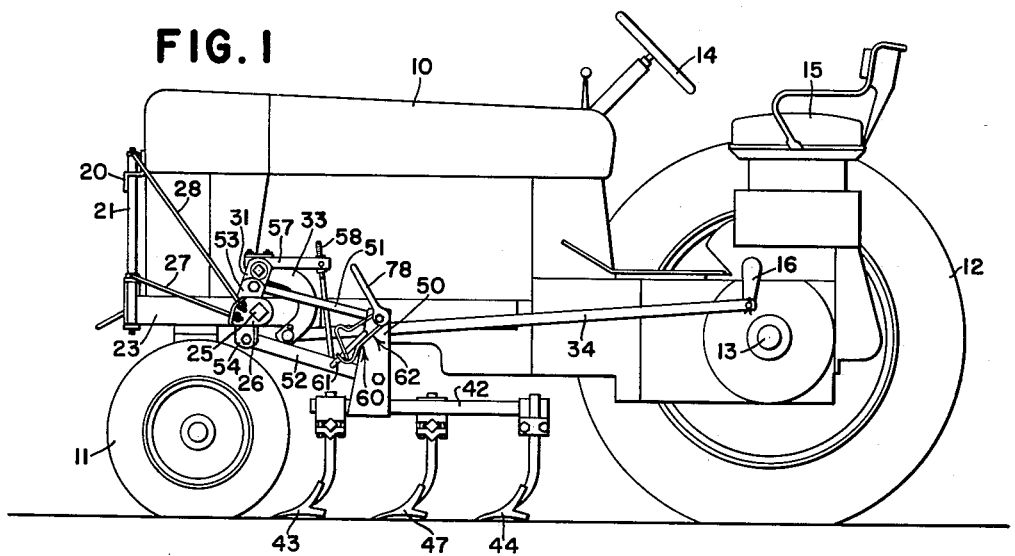
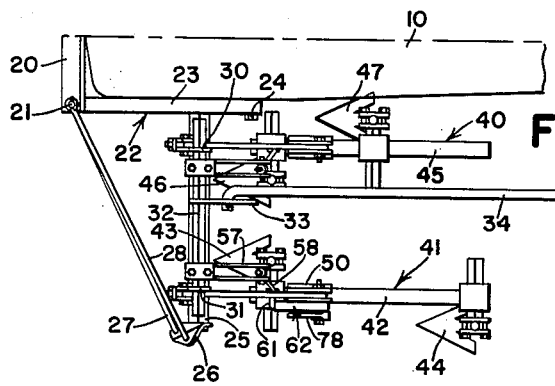
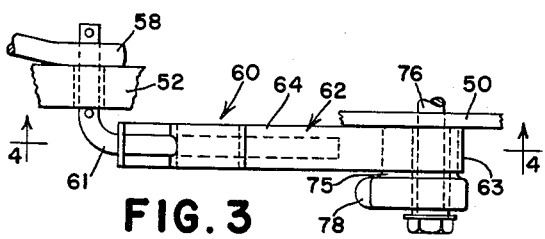
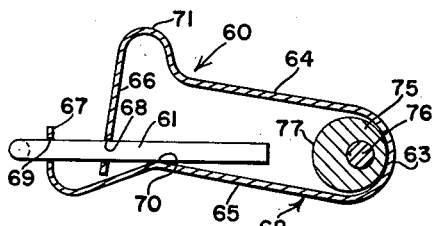
INVENTORS
C. S. MORRISON
R. E. HARRINGTON
BY *C. T. Parker* and *W. A. Murray*
ATTORNEYS

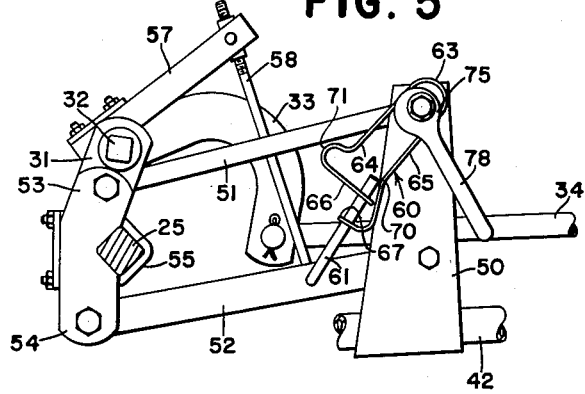
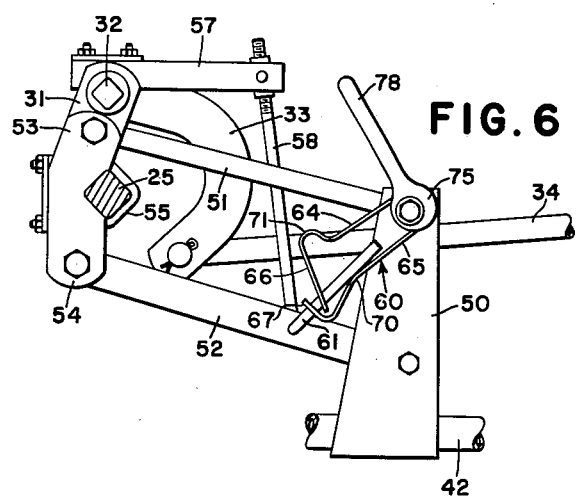
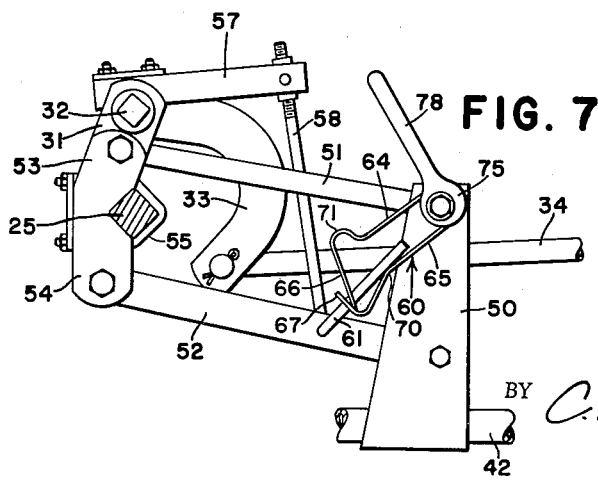

United States Patent Office 2,987,127
Patented June 6, 1961

2,987,127
FARM IMPLEMENT
Charles S. Morrison and Roy E. Harrington, Moline, Ill., assignors to Deere & Company, Moline, Ill., a corporation of Delaware
Filed Apr. 20, 1959, Ser. No. 807,681
6 Claims. (Cl. 172—484)

This invention relates to a farm implement and more particularly to a drive-in drive-out type of cultivator. Still more particularly this invention relates to a friction release lock which extends between the main cultivator frame and the tool frame or standard which maintains the main frame at a desired height for attachment to the tractor.

In the conventional type of drive-in drive-out type of cultivator, there is provided structure forming a vertical pivot at the forward end of the tractor on which the cultivator frame and its associated cultivator tools may swing laterally between a side-adjacent position relative to the tractor and a position spacedly outward from the tractor. The main or primary cultivator frame may be attached and detached from the tractor. The cultivator rigs are composed of a secondary frame or tool standard which has cultivator tools mounted in depending relation therefrom. In the more conventional type of cultivators, there is provided a parallel linkage system between the primary and secondary frames which permits the entire secondary frames or standards and their tools to be raised or lowered while retaining a fixed angular relation to the ground. The parallel linkage is operated to raise and lower the tool standard by means of a hydraulic lift system operated from the hydraulic system of the tractor. There is therefore provided a relatively large force by the hydraulic lift system for purposes of raising or lowering the cultivator tools. Normally, upon the cultivator being dismounted from the tractor, there is provided means either in the form of a manually adjustable stand or locking bar or clamp which extends between the cultivator standard and the parallel linkage and holds the entire cultivator frame at a fixed position relative to the standard and in a position which may readily be attached to the tractor upon the tractor being driven adjacent to the frame.

The problem arising by the bar being connected to the standard and the parallel linkage occurs somewhat due to the negligence of the operator in that in many instances the bar will not be removed once the cultivator is attached to the tractor. Thereupon, the operator will attempt to raise the cultivator standard and tools without the bar being removed and will cause a fracture in either the lock, the standard, the parallel linkage, and/or their respective connections. Further, it would be desirable from a simplicity standpoint to provide a type of lock which may be released by the power from the tractor thereby eliminating work and time necesary to manually release it and/or to eliminate the necessity of a stand.

It is therefore the primary object of this invention to incorporate for use with a drive-in drive-out type of implement of the type described, a friction release lock extending between the parallel links of the lift system and the standard or secondary frame which will automatically release itself upon the hydraulic lift system being used to raise the cultivator tools from the ground.

It is a further object of the invention to provide a new and novel type of friction release lock featuring an elongated rigid shaft or rod which frictionally engages a locking element and which may be released upon the tools being lowered from a raised position. The locking member or element features a one-piece metal strap member having a bight portion spaced from and facing the end of the shaft and a pair of leg portions extending from the bight on opposite sides of the shaft or rod. The leg portions are turned inwardly at their free ends and have openings at the free end portions to receive the end of the rod or shaft. One of the leg portions of the metal strap has an abutment which also engages the rod and operates in conjunction with the openings to exert a clamping action on the rod. The other of the leg portions has the edges of its opening frictionally engaged with the shaft. The frictional resistance of the edges of the opening may be varied by tightening the leg portions, the particular method used in the present instance being to drive the bight portion of the one-piece metal strap away from the rod thereby causing the strap member itself to spring load the lock.

In the particular environment here used, the spring load will normally resist releasing the rod unless there are several hundred pounds of axial force applied to the rod. The lock will therefore normally tend to support the cultivator frame when the latter is detached from the tractor. However, should the lock be overlooked upon the cultivator being attached to the tractor, the load or force created on the rod by the hydraulic system would tend to extend the lock. Also, the hydraulic system on the tractor may be purposely used for releasing the lock.

Other objects and advantages of the present invention will occur to those skilled in the art as the nature of the invention is better understood following the description set forth in the present specification and as shown in the accompanying drawings.

FIG. 1 is a side view of the cultivator and tractor with portions of the tractor being removed for purposes of clarity.

FIG. 2 is a plan view of the left section of the cultivator and the left forward portion of the tractor body.

FIG. 3 is an enlarged plan view of the locking mechanism.

FIG. 4 is a sectional view taken substantially along the line 4—4 of FIG. 3.

FIG. 5 is a side view of the lift mechanism of the cultivator and the lock mechanism with the locking mechanism disengaged.

FIG. 6 is a view similar to FIG. 5 with the lock mechanism in an engaged position.

FIG. 7 is a side view similar to FIGS. 5 and 6 showing the lock mechanism at its maximum locking position and just prior to its being released.

Referring to FIG. 1, there is therein provided a tractor having an elongated body 10 supported at its forward end by front steerable wheels 11 and at its rear by transversely spaced traction wheels, one of which is shown at 12, carried on opposite ends of a rear transverse axle structure 13. Provided on the tractor is an operator's station indicated generally by the steering wheel 14 and the operator's seat 15. The tractor has a hydraulic system, not shown, terminating in a hydraulically operated rockarm 16.

The cultivator includes structure 20 mounted on the forward end of the tractor which supports the vertical shaft 21 on which is pivotally mounted a rearwardly and outwardly extending main or primary frame 22. The frame 22 includes a rearwardly extending beam 23 which normally lies adjacent to and is fixed to the side of the tractor body by a bolt 24, and an outwardly extending tool bar 25 fixed at its inner end to the beam 23 and having at its outer end a flared plate 26 which is connected to the vertical shaft 21 by means of tie rods 27, 28. As would appear to be fairly obvious, the entire cultivator is composed of two sections, one on each side of the tractor body 10. Since they are identical, description and the drawings are herein limited to show and describe only that on the left side of the tractor body 10. Also, the basic construction of the cultivator is well known and is shown and described in detail in U.S. Patent 2,423,148, issued to T. W. Johnson and later reissued under U.S. Patent Re. 23,154. Since the detailed description is shown in the aforesaid Johnson patents, such will be repeated only to the extent deemed necessary to fully and concisely illustrate the principles of the present invention. However, should further details of the cultivator and its method of mounting on the tractor be desired, such may be had by referring to those patents.

Supported on the tool bar 25 and extending upwardly therefrom are a pair of transversely spaced brackets 30, 31 which support a transverse rockshaft 32 on which is fixed an arcuate-shaped rockarm 33. The rockarm 16 of the hydraulic system on the tractor and the rockarm 33 are interconnected by a force-transmitting rod 34. Also supported on the tool bar 25 is a pair of cultivator rigs indicated in their entirety by reference numerals 40, 41. The rig 41 includes a fore-and-aft extending tool carrier shaft 42 on which is mounted cultivator tools 43, 44. The inner rig 40 is provided with a fore-and-aft extending shaft 45 with fore-and-aft spaced cultivator tools 46, 47 mounted thereon. Referring again to the outer cultivator rig 41, the shaft 42 is fixed to an upwardly projecting rig or secondary frame 50 which in turn is pivotally connected to the rear ends of parallel links or arms 51, 52. The links 51, 52 are pivotally connected at their forward ends to upwardly and downwardly projecting bracket portions 53, 54 respectively which are clamped at 55 to the tool bar 25. The parallel links 51, 52 are raised and lowered by means of a rockarm 57 fixed at its forward end to the rockshaft 32 and connected to the lower of the parallel links by means of a rod 58. As is obvious from viewing FIG. 1, the rig assemblies 40, 41 may be raised and lowered by operating the hydraulic rockshaft 16 so as to raise and lower the parallel linkage connecting the rigs 40, 41 to the tool bar 25. While reference has been made to the linkage and supporting structure for the outer rig 41, it should also be recognized that identical structure is provided for raising and lowering the inner rig 40 and consequently description has been and will be limited only to the linkage required to raise the outer rig.

In dismounting the cultivator from the tractor, it is necessary to remove the bolt 24 so as to release the beam 23 from the tractor body. Prior to removal, it is required to lower the cultivator rigs 40, 41 into ground engaging position or substantially as shown in FIG. 1. Since the rod 34 will be disconnected from the rockarm 16, it is desirable to lock the cultivator rigs into their ground engaging position so as to hold the cultivator frame structure substantially at the height of attachment to the tractor. It is for this latter purpose that a friction release lock mechanism, indicated in its entirety by the reference numeral 60, is provided.

The friction release lock 60 is composed of a two-piece locking mechanism, one of which includes an elongated rigid shaft or rod 61 having a forward end turned inwardly to extend through the lower parallel link or arm 52 and the lower end of the lift rod 58. The latter connection to the rod 58 has no bearing upon the present invention, but is done only for structural convenience. The shaft 61 extends from its connection to the lower link 52 upwardly and rearwardly. The second part of the friction release lock is a one-piece metal strap member 62 having a bight portion 63 spaced from and facing the end of the rod 61 and a pair of oppositely disposed leg portions 64, 65 extending forwardly and downwardly from the bight portion 63. The leg portions 64, 65 have forwardly disposed free end portions 66, 67 turned downwardly and upwardly respectively toward the opposite leg portions. The front portions 66, 67 are provided with openings 68, 69 through which the shaft 61 may extend. The lower leg portion 65 is also provided with an abutment, as at 70, which engages the underside of the rod 61. The abutment 70 is disposed rearwardly of the opening 69 so as to permit the rod 61 to bridge the space between the walls of the openings 69 and the abutment 70. Provided in the upper leg portion 64 is a hump 71 which is conducive to deformity to effect a spring load on the forward portion 66. The forward end portion 66 is inclined to the rod 61 and normally the rear edge of the upper wall portion and the forward edge of the lower wall portion forming the opening 68 contacts the upper and lower surfaces respectively of the rod 61 thereby causing frictional engagement between the rod 61 and the walls of the opening 68, the walls of the opening 69 and the abutment 70 maintain the friction engagement.

Adjacent the rear end of the strap 62 and internally of the bight portion 63 is an eccentric 75 mounted on a pivot shaft 76. The eccentric has an outer peripheral surface 77 which engages the inner surface of the bight portion 63 and an axial portion extending outwardly beyond the edge of the strap 62, the latter portion of the eccentric being provided with a lever 78 by which the eccentric may be rotated. As the lever 78 rotates or moves the eccentric 75, the surface of the eccentric will cause the bight portion 63 to move rearwardly and away from the shaft 61 which will in effect cause the lock to be engaged in the manner presently to be described.

Referring first to FIG. 5 to show operation of the locking mechanism, there is therein shown the frame 50 in a position in which the cultivator rigs are in the raised position or spaced from the ground. The lock mechanism 60 is disengaged and rod 61 is relatively free to move axially within the strap member 62. However, even in this position there will be a slight degree of friction between the walls of opening 68 and the rod 61. Since it may be assumed that in the normal operation of the cultivator, the cultivator rigs will be raised and lowered several times, the bight portion 63 of the strap member 62 is spaced from the eccentric 75. Due to the slight amount of friction involved between the end portions 66, 67 and the rod 61, the bight portion 63 will be maintained spacedly from the cam 75. However, the cam 75 is free to rotate on the shaft 76 and graviation will tend to force the lever or handle 78 downwardly as in the position shown.

Now referring to FIG. 6, the cultivator rigs have been lowered to engagement with the ground. The bight portion 63 has been moved forwardly and downwardly into engagement with the cam 75 and the cam or eccentric 75 is then rotated substantially a half turn by the lever 78. This causes the bight portion 63 to move away from the rod 61 and causes the strap member 62 to deform since the frictional engagement of the walls of the opening 68 will limit movement of the end portion 66 along the rod. The deformity in the strap member 62 will cause tighter engagement of the walls of the opening 68 with the rod 61 so that a greater amount of axial pressure on the rod 61 will be necessary to cause the rod 61 to move. The bight portion 63 may be manually moved axially relative to the rod prior to the time that the cam or eccentric applies pressure to the bight portion. However, upon pressure being applied to the bight portion, the strap 62 itself will operate as a spring to increase the pressure of the walls of the opening 68 on the rod 61. At this time greater pressure or force is required to move the rod. Upon the lock being engaged, the cultivator frame may be detached from the tractor body without fear of the parallel linkages 51, 52 collapsing. Consequently, the cultivator rigs will afford support for the parallel linkages as well as the entire cultivator frame 22.

Referring now to Fig. 7, the lock mechanism is shown in a position following attachment of the cultivator to the tractor body and after the lift rod has started to lift the cultivator rigs 40, 41 off the ground. The force of the hydraulic system on the tractor is considerably greater than the load on the force of the locking mechanism 60.

and consequently as the hydraulic unit is operated the strap 62 will further deform and also a degree of sliding will occur between the rod and the walls of the opening 69 and the abutment 70. At the point of movement shown in FIG. 7, the lock is still engaged. However, upon further movement of the force-transmitting rod 34 rearwardly, the front portion 67 of the leg 65 will contact the front portion 66 of the leg 64 and drive the latter rearwardly toward a position normal to the rod 61. This action will release the spring load of the strap 62 and particularly that created by the hump 71 so that the entire lock is released. The cam 75 will then gravitate to a position as shown in FIG. 5. The strap 62 may then move into the position shown generally in FIG. 5 where the entire locking mechanism for practical purposes is disengaged. In this latter position there is little resistance to movement between the lower link 52 and the upright frame 50. Consequently, the cultivator rigs are permitted free movement up or down. The lock remains disengaged until manually set.

While only one form of the invention has been shown, it should be recognized that other forms and variations will occur to those skilled in the art. Consequently, while the present form was shown and described in detail for the purpose of concisely illustrating the principles of the invention, it was not the intention to so limit or narrow the invention beyond the broad general principles set forth in the appended claims.

What is claimed is:

1. A friction release lock comprising: an elongated rigid shaft member; a one-piece metal strap member having a bight portion spaced from and facing one end of the shaft and a pair of oppositely disposed leg portions extending from the bight portion on opposite sides of the shaft member, said leg portions terminating in free end portions turned inwardly toward the other leg portion, the end portion of one of said leg portions being inclined to the shaft; each of said free end portions having an opening therein through which the shaft may pass; an abutment on the other of said leg portions engaging said shaft whereby said shaft will bridge the area between the abutment and the opening of the end portion of the respective leg portion, said abutment and walls of said openings effecting frictional engagement with the shaft to resist longitudinal movement of the shaft relative to the strap; an eccentric supported externally of and disposed adjacent and internally of the bight portion and having a peripheral surface engaging the inner surface of the bight portion; and means rotating the eccentric to cause movement of the bight portion away from the shaft to effectively increase the frictional engagement on the shaft.

2. A friction release lock comprising: an elongated rigid shaft member; a one-piece metal strap member having a bight portion spaced from and facing one end of the shaft and a pair of oppositely disposed leg portions extending from the bight portion on opposite sides of the shaft member, said leg portions terminating in free end portions turned inwardly toward the other leg portion, each of said free end portions having an opening therein through which the shaft may pass; an abutment on the other of said leg portions engaging said shaft whereby said shaft will bridge the area between the abutment and the opening of the end portion of the respective leg portion, said abutment and walls of said openings effecting frictional engagement with the shaft to resist longitudinal movement of the shaft relative to the strap; an eccentric supported externally of and disposed adjacent and internally of the bight portion and having a peripheral surface engaging the inner surface of the bight portion; and means rotating the eccentric to cause movement of the bight portion away from the shaft to effectively increase pressure of the walls of the openings and the abutment on the shaft.

3. In an implement of the type described having a primary frame attachable to a tractor and normally supportable at a fixed height relative to the ground, a secondary frame supporting ground engaging tools, means connecting said primary and secondary frames, including an elongated arm connected at opposite ends to each of the frames, and means including power means for causing angular movement between the arm and secondary frame to effect relative vertical movement between the secondary frame and the primary frame, a friction release lock restrictively maintaining a fixed angular relation between the secondary frame and arm comprising: an elongated rigid element pivoted at one end on said arm and directed toward said secondary frame, a one-piece metal strap member having a bight portion spaced from and facing one end of the element and a pair of oppositely disposed leg portions extending from the bight portion on opposite sides of the element, each of said leg portions terminating in free end portions turned inwardly toward the other leg portion, the end portion of one of said leg portions being inclined to the element, each of said free end portions having an opening therein through which the element may pass, an abutment on one of said leg portions engaging said element whereby said element will bridge the area between the abutment and the opening of the end portion of the respective leg portion, said abutment and walls of said openings effecting frictional engagement with the element to resist longitudinal movement of the element and the strap member; an eccentric mounted on the secondary frame adjacent and internally of the bight portion and having a peripheral surface engaging the inner surface of the bight portion; and means rotating the eccentric to cause movement of the bight portion away from the element to effectively increase pressure of the walls of the openings on the element.

4. In an implement of the type described having a primary frame attachable to a tractor and normally supportable at a fixed height relative to the ground, a secondary frame supporting ground engaging tools, means connecting said primary and secondary frames, and means including power means for effecting relative vertical movement between the secondary frame and the primary frame, a friction release lock restrictively maintaining a fixed vertical relation between the frames comprising: an elongated rigid element supported at one end on one of said frames and directed toward the other of said frames, a one-piece metal strap member having a bight portion spaced from and facing one end of the element and a pair of oppositely disposed leg portions extending from the bight portion on opposite sides of the element, each of said leg portions terminating in free end portions turned inwardly toward the other leg portion, each of said free end portions having an opening therein through which the element may pass, an abutment on one of said leg portions engaging said element whereby said element will bridge the area between the abutment and the opening of the end portion of the respective leg portion, said abutment and walls of said openings effecting frictional engagement with the element to resist longitudinal movement of the element relative to the strap member; an eccentric mounted on said other of said frames adjacent and internally of the bight portion and having a peripheral surface engaging the inner surface of the bight portion; and means rotating the eccentric to cause movement of the bight portion away from the element to effectively increase pressure of the walls of the openings on the element.

5. In an implement of the type described having a primary frame attachable to a tractor and normally supportable at a fixed height relative to the ground, a secondary frame supporting ground engaging tools, means connecting said primary and secondary frames, and means including power means for effecting relative vertical movement between the secondary frame and the primary frame, a friction release lock restrictively maintaining a fixed vertical relation between the frames comprising: an elongated rigid element supported at one end on one of said frames and directed toward the other of said frames, a pair of oppositely disposed leg members supported on said other frame positioned on opposite sides of the element, each of said leg members terminating in free end portions turned inwardly toward the other leg member, each of said free end portions having an opening therein through which the element may pass, an abutment on one of said leg members engaging said element whereby said element will bridge the area between the abutment and the opening of the end portion of the respective leg member, said abutment and walls of said openings effecting frictional engagement with the element to resist longitudinal movement of the element relative to the leg members; and means on said other of said frames for adjusting the leg members to effect the pressure of the walls of the openings on the element.

6. In an implement of the type described having a primary frame attachable to a tractor and normally supportable at a fixed height relative to the ground, a secondary frame supporting ground engaging tools, means connecting said primary and secondary frames, and means including power means for effecting relative vertical movement between the secondary frame and the primary frame, a friction release lock restrictively maintaining a fixed vertical relation between the frames comprising: an elongated rigid element supported at one end on one of said frames and directed toward the other of said frames, a pair of oppositely disposed members supported on said other frame positioned on opposite sides of the element, each of said members having portions engageable with the element and effecting frictional engagement with the element to resist longitudinal movement of the element relative to said members; and means on said other of said frames for adjusting the members to effect the pressure of the engaging portions on the element.

References Cited in the file of this patent
UNITED STATES PATENTS

| | | |
|---|---|---|
| 395,146 | Hunt et al. | Dec. 25, 1888 |
| 639,876 | Warner | Dec. 26, 1899 |
| 2,341,465 | Monnot | Feb. 8, 1944 |
| 2,553,886 | Vevier | May 22, 1951 |
| 2,584,217 | Morkoski | Feb. 5, 1952 |
| 2,809,720 | Reid | Oct. 15, 1957 |
| 2,870,874 | Politte | Jan. 27, 1959 |
| 2,886,114 | Peterson | May 12, 1959 |